UNITED STATES PATENT OFFICE.

EDWARD R. STOWELL, OF PORTLAND, INDIANA, ASSIGNOR TO STOWELL FIRE-PROOFING COMPANY, OF MANISTEE, MICHIGAN, A CORPORATION OF DELAWARE.

PROCESS FOR THE MAKING OF AN INSULATING AND PROTECTIVE COATING.

1,350,343.  Specification of Letters Patent.  Patented Aug. 24, 1920.

No Drawing. Application filed July 1, 1918, Serial No. 242,852. Renewed April 10, 1920. Serial No. 373,006.

*To all whom it may concern:*

Be it known that I, EDWARD R. STOWELL, a citizen of the United States, and a resident of Portland, in the county of Emmet, State of Indiana, have invented and discovered a new and useful process for the making of an insulating and protective coating for application to the brick linings in furnaces, ovens, kilns, etc., and for application to superheated metal surfaces and to any surface exposed to acid and acid-fumes, corrosive gases, and extreme high temperatures. This said coating will seal the expansion and other cracks in refractory linings, prevent infiltration of cold air, prevent absorption of heat by linings and the loss of heat by radiations to a great extent, save fuel, and increase the life of linings and other surfaces to which applied.

The process is applied in practice as follows:—In four gallons of water (hot water preferably) dissolve one pound of sodium hydroxid and place this solution in a vessel of at least thirty gallons capacity. For each gallon of this caustic solution use eight pounds of finely powdered carbid of silicon. Put this powder in the container in lots of eight to ten pounds each and stir briskly, incorporate the specified amount in this manner. Cover the container, but not air tight, and let set for a few hours. The reaction between the soda-lye and the free silicon in the carbid of silicon will cause hydrogen gas to form and this in turn will cause the entire composition to foam, requiring the thirty gallon container for the six to eight gallons of composition. When the composition has ceased to form gas and to foam it should be stirred down to the consistency of a thick paint or paste and to this is added one pint of 50 to 54 degree sodium silicate for each gallon of the composition.

Sufficient sodium silicate having been added to make the composition the consistency of a very thick paint, it may be packed in sealed containers and marketed for the purposes specified.

Having described this process, what I claim as my invention and discovery and wish to secure by Letters Patent, is—

1. The herein described process for making a high temperature insulating and protective coating by treating carbid of silicon in a solution of sodium hydroxid (soda-lye) and then mixing same with sodium silicate.

2. The herein described process for the making of a refractory and protective coating by combining sodium hydroxid with water, adding to each gallon of this lye solution approximately eight pounds of powdered carbid of silicon, incorporate well, let stand in covered container of sufficient capacity until the hydrogen gas formed by the action of the free alkali on the free silicon in the composition is exhausted, stirring the foam like composition which will result until it is reduced to the original quantity and then adding one pint of 50 to 54 degree sodium silicate to each gallon of the composition as thus formed.

In testimony whereof I have subscribed my name in the presence of two subscribing witnesses.

EDWARD R. STOWELL. [L. S.]

Witnesses:
JOHN AUSTIN,
VOLNEY POWELL.